United States Patent [19]
Popat

[11] Patent Number: 5,623,672
[45] Date of Patent: Apr. 22, 1997

[54] ARRANGEMENT AND METHOD OF ARBITRATION FOR A RESOURCE WITH SHARED USER REQUEST SIGNALS AND DYNAMIC PRIORITY ASSIGNMENT

[75] Inventor: Kaushik L. Popat, Pleasanton, Calif.

[73] Assignee: Cirrus Logic, Inc., Fremont, Calif.

[21] Appl. No.: 363,039

[22] Filed: Dec. 23, 1994

[51] Int. Cl.⁶ .............................. G06F 9/46; G06F 13/14
[52] U.S. Cl. .................. 395/728; 395/729; 395/731; 395/732; 395/291; 395/292; 395/293; 395/296; 395/297; 395/860; 395/861; 395/865; 395/280; 395/287
[58] Field of Search .................... 395/725, 732, 395/297, 304, 865, 293, 291, 200.15, 295, 296, 302, 303, 731, 729

[56] References Cited

U.S. PATENT DOCUMENTS

| | | | |
|---|---|---|---|
| 4,641,266 | 2/1987 | Walsh | 395/291 |
| 4,814,974 | 3/1989 | Narayanan et al. | 395/732 |
| 4,969,120 | 11/1990 | Azevedo et al. | 395/297 |
| 5,072,363 | 12/1991 | Gallagher | 395/732 |
| 5,088,024 | 2/1992 | Vernon et al. | 395/729 |
| 5,263,163 | 11/1993 | Holt et al. | 395/297 |
| 5,301,283 | 4/1994 | Thacker et al. | 395/729 |
| 5,392,434 | 2/1995 | Bryant et al. | 395/729 |

*Primary Examiner*—Jack B. Harvey
*Assistant Examiner*—Raymond N. Phan
*Attorney, Agent, or Firm*—John A. Hankins; Leon R. Turkevich; J. P. Violette

[57] ABSTRACT

A method and apparatus for arbitration among users for a resource has a single shared user request line over which each of the users asserts request signals for use of the resource. Dynamic priority assignment is provided, in which the sequence of users is changed as a function of the last user to use the resource. A time multiplexed format for arbitration is followed, with each user keeping track of which user's turn it is to request use of the resource. This prevents starvation of an individual user and allows great flexibility in assigning priority to the users, while reducing pin counts and signal traces.

39 Claims, 4 Drawing Sheets

ARRANGEMENT AND METHOD OF ARBITRATION FOR A RESOURCE WITH SHARED USER REQUEST SIGNALS AND DYNAMIC PRIORITY ASSIGNMENT

BACKGROUND OF THE INVENTION

1. Technical Field of the Invention

The present invention relates to the field of digital computers, and more particularly, to arbitration between a plurality of users for the use of a shared resource, such as a bus.

2. Description of Related Art

A digital computer has a set of functional components of at least three basic types: memory units, input/output (I/O) devices, and central processing units (CPUs). Practical and useful operation of a computer involves the communication of data and synchronization/control signals between all of the various components which comprise it. The collection of paths which logically connect the functional units of a computer together and enable the communication of information between them is called an interconnection structure.

An interconnection structure should be able to support information transfers between the memory units, the I/O devices, and the CPU. In addition to supporting these transfers, the interconnection structure is commonly employed to carry control signals used to initiate transfers by the various functional units, and also to provide electrical power to the units.

One of the most common interconnection strategies used in the design of both single and multiple processor computers is a "shared bus" architecture, in which the functional units of the system are connected by a common collection of conductive lines called a bus. This bus can be considered to be a shared resource. Only one module at a time can exert control over the use of a shared bus, and contention among the units which require the use of a bus must be resolved in some manner. In a centralized method of arbitration, a single hardware device, referred to as a bus controller or central arbiter, is responsible for allocating time on the bus among all units which may wish to use it. Alternatively, the arbitration and control logic associated with the use of a bus can be distributed equally among the various units which are interfaced to the bus.

Whether a bus is implemented with a central arbiter or with a distributed control arrangement, the implementation of a bus in a computer system can be additionally characterized by a number of other features. One of these functions is the particular arbitration policy employed, which determines how access to the bus is obtained.

Many of the various techniques of bus arbitration known in the art can be broadly classified according to whether they employ a fixed or dynamic priority assignment among the units interfaced to a bus. In a fixed priority policy of arbitration, each unit that will participate in bus arbitration is assigned a certain priority level at start-up or configuration time. Whenever two or more units are in contention for use of the shared bus, access is unconditionally granted to the unit having the highest fixed level of priority. This approach is often implemented using a scheme called "daisy chaining," in which all units are assigned static priorities according to their locations along a common bus request line. Any unit which requires the bus asserts a request on the common request line. The bus arbitration mechanism polls each unit on the bus in order of priority until encountering a device which has requested use of the bus, and that device is granted access to the bus. This polling after each request to determine the identity of the requesting user adds delay to the system.

To avoid polling, some systems use separate pairs of request and acknowledge lines between each user and the shared resource. Where the arbiter is an integrated circuit, additional signal traces and separate pins on the integrated circuit are required for each of these separate request and acknowledge lines. Increases in the number of pins in an integrated circuit can significantly increase the cost of the integrated circuit.

Although simple to implement, fixed priority arbitration schemes are often considered unacceptable, especially in multi-processor systems, since repeated bus access requests from a high-priority unit can prevent lower priority units from ever obtaining access to the bus. Such a condition is called starvation, and can occur in any scheme which involves a strictly static priority assignment. Static priority schemes are said to be nonsymmetric, since they tend to favor certain arbitrating units (ones with higher priority) and neglect others.

In an arbitration scheme called fixed time slicing (FTS) or time division multiplexing (TDM), a static priority assignment is enhanced with a method for ensuring that no unit is starved. This is accomplished by dividing the available bus time into fixed-size intervals, and then sequentially offering these intervals to each device in a round-robin fashion in order of priority. Should a selected device not elect to use its time slice, the time slice remains unused by any device. This scheme exhibits the desired property of symmetry since no arbitrating unit is given preference over any other.

Dynamic priority assignments have been used as another method to eliminate the problem of starvation by allowing the assignment of priority to change during the course of system operation. Dynamic priority schemes are said to be symmetric if the algorithm which determines the periodic reassignment of priorities does not tend to give preference to one particular arbitrating unit. A least-recently-used algorithm, for example, gives the highest reassigned priority to that unit which has not used the bus for the longest interval. Another dynamic priority assignment scheme, called a rotating daisy chain, determines reassigned priority based on each unit's distance from the winner of the previous arbitration.

SUMMARY OF THE INVENTION

There is a need for an arrangement and a method for arbitrating among a plurality of users for the use of a shared resource, which minimizes required pin count and signal traces, while supporting dynamic priority assignment of the users.

This and other needs are met by the present invention which provides a shared resource arrangement comprising a shared resource, a plurality of users coupled to the resource, and arbitration logic for arbitrating among the users for use of the resource, the arbitration logic allowing the users to make requests over a single shared request line for use of the resource in a given sequence of users, and changing said sequence to a new sequence after each use of the resource by one of the users.

The use of a single, shared request line over which each of the users makes requests, reduces required pin counts of an integrated circuit since the integrated circuit receives request signals over only one line, regardless of the number of users. The changing of the sequence of users to a new sequence after each use of the resource provides for dynamic assigning of the priority of the users.

The needs of the present invention are also met by a method of arbitrating among users for a shared resource, the method comprising: (a) assigning time slots to the users in a sequence; (b) sequencing through the time slots according to the sequence, each user able to issue a request only during the time slot assigned to that user; (c) accepting a request from a user issuing a request during the time slot assigned to said user and allowing the user to use the shared resource; (d) changing the sequence of users after use of the shared resource by the user allowed to use the shared resource; and (e) repeating steps b–d.

The method of the present invention provides the advantages of the time multiplexing method of arbitration with the advantages associated with methods that use dynamic priority assignment.

The foregoing and other objects, features, aspects and advantages of the present invention will become more apparent from the following detailed description of the present invention when taken in conjunction with the accompanying drawings.

DETAILED DESCRIPTION OF THE ILLUSTRATIVE EMBODIMENTS

Figure 1:
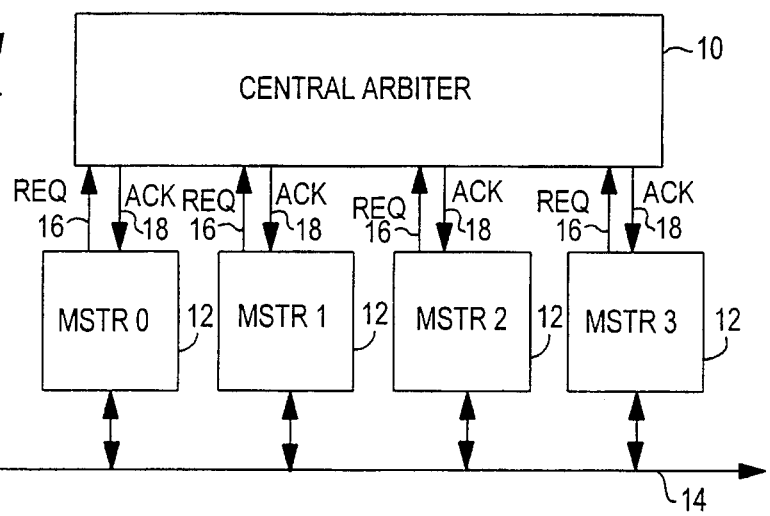
FIG. 1 is a block diagram of a prior art arrangement of a computer system.

FIG. 1 is a block diagram of a prior art arrangement illustrating the use of a shared resource, in this instance, a bus 14. A central arbitrator 10 arbitrates for use of the bus 14 among a plurality of masters 12. In this example, four masters MSTR0–MSTR3 are provided.

Each of the masters 12 are coupled to the central arbiter 10 via a separate request line 16 and a separate acknowledge line 18. When a master 12 desires to arbitrate for use of the bus 14, a request signal is sent to the central arbiter 10 on the request line 16. When the master 12, wins the arbitration, the central arbiter 10 asserts the acknowledge line 18 to that specific master 12. Since there are four masters in this example, and each master 12 requires a separate request line 16 and a separate acknowledge line 18, a total of eight lines are connected to the central arbiter 10 from the masters 12. This necessitates eight pin connections into the central arbiter 10 and is therefore undesirable.

Figure 2:
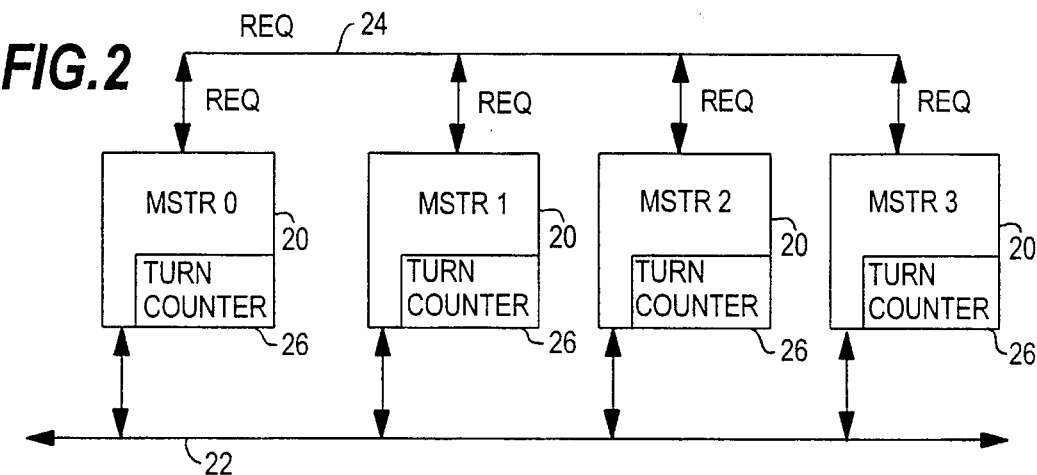
FIG. 2 is a block diagram of a computer system constructed in accordance with an embodiment of the present invention.

FIG. 2 is a block diagram of the present invention depicting a plurality of masters 20 which arbitrate for the use of a bus 22 in a distributed arbitration scheme. The masters 20 are coupled to one another via a single request line 24. The reservation signal (the request signal) is a time multiplexed reservation signal. In the invention, each bus master 20 is able to make a request by asserting the request signal on the shared request line 24 only in the time slot assigned to that master 20. The master 20 will assert the request signal starting in its time slot, deasserts the request signal in the next clock cycle and then does not drive the request signal (returns to a default high impedance state) in the following clock cycle.

In preferred embodiments of the present invention, a single weak pull-up maintains a high level when the request line is not driven by any user. This solves a potential problem of slow rise time or strong pull-up with high-power dissipation when using wire OR'ed signals.

Each of the masters 20 monitors the request line 24 and keeps track of pending requests. A master 20 will drive the request signal only during its time slot. The first arbitration cycle will begin at reset and subsequent cycles begin at the second clock cycle of each bus transfer. The arbitration cycle ends when a master 20 asserts the request signal. A requesting master 20 that has reserved the bus begins its transfer any time after completion of the current transfer.

In order to keep track of the current time slot number (termed the "turn counter") that indicates which master's turn it is to request the bus, each master 20 has a turn counter 26. At system reset, the turn counter 26 in all of the masters 20 are initialized to zero. Following reset, each turn counter 26 is incremented until a request signal is posted to reserve the bus 22. This will end the particular arbitration cycle. The turn counter 26 in each master 20 is then held with the value of the reserving master 20 (MSTR0–MSTR3) until the bus transfer starts as indicated by assertion of the frame signal by the requesting master 20.

In the clock cycle after the frame signal is first asserted by the requesting master 20, each turn counter 26 is incremented and a new arbitration cycle starts. In this arbitration cycle, the next sequential master 20 is provided with the first opportunity to post a request signal, and the current user has the last opportunity to request the use of the bus again. This scheme therefore is a fully distributed round robin bus arbitration scheme, and provides a dynamic reassignment of priority after each use of the bus by a master 20.

In the method of the present invention, each of the masters 20 will have the same value in the turn counters 26 in each clock cycle. Each master 20 will track their reservation cycle (the request signal) and the signal that indicates a bus transfer is being performed (the frame signal). Therefore, each master 20 knows whether the bus 22 is reserved for the next transfer, and if so, which master has reserved the bus 22. Each master 20 also knows which master's turn it is to request a reservation of the bus 22 if the bus 22 has not been reserved.

Figure 3:
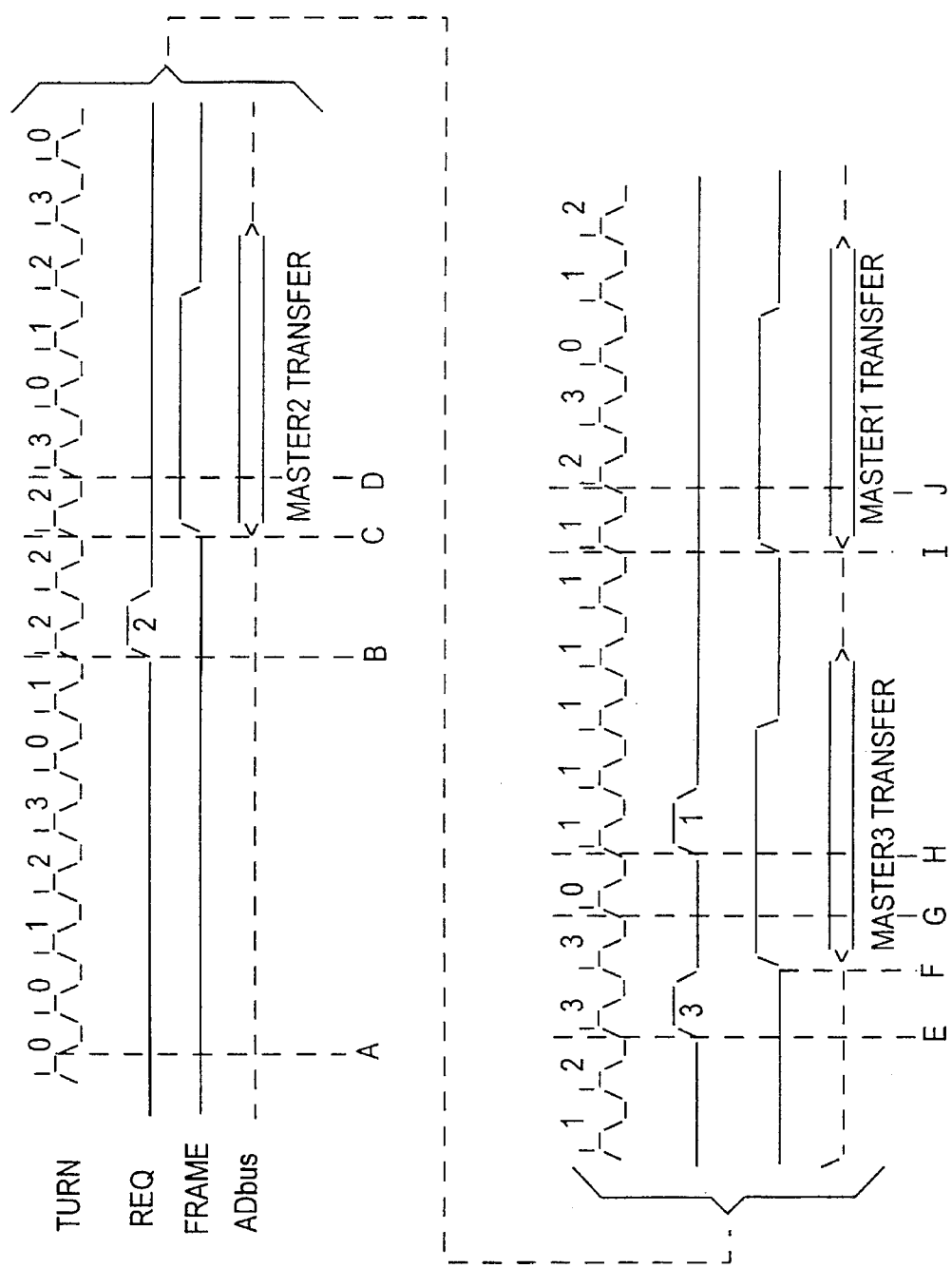
FIG. 3 is a timing diagram of an exemplary arbitration using an embodiment of the method of the present invention and the arrangement of FIG. 2.

An example of the operation of the embodiment of FIG. 2 and the method employing a fully distributed round robin bus arbitration will be described with respect to the timing diagram of FIG. 3. At event A, the system is reset so that each of the turn counters 26 of the masters 20 is initialized to a specific value in the turn count, in this example 0. In the next clock cycle, it is the turn of master MSTR0 to assert a reservation signal (the request signal REQ) to reserve the use of the bus 22. However, the master MSTR0 does not assert the REQ signal at this time. Each of the masters 20 will then increment its own turn counter 26 to indicate that MSTR1 is able to assert the request signal in the next clock cycle. After each of the individual masters MSTR0–MSTR3 have had an opportunity to assert a request signal, the first master in the sequence MSTR0 is again provided with the opportunity to assert the REQ signal during its assigned time slot.

In this example, the first master 20 to assert the request signal is MSTR2 at event B. This ends the arbitration cycle. Each turn counter 26 in each of the masters 20 is held at the current turn count value of 2 until the next arbitration cycle begins.

The frame signal is asserted at event C to indicate that the master 2 is performing the transfer for which it requested use of the bus 22. One cycle after the transfer begins, as indicated by the frame signal, the next arbitration cycle begins, however, with the new sequence of arbitration beginning with the master MSTR3 having the top priority. The order in the sequence (i.e. 0, 1, 2, 3) remains the same although the sequence has been changed.

The new arbitration cycle begins (event D) during the transfer of the data, thus reducing the latency which would otherwise be present by waiting until the transfer is completed until the next arbitration cycle begins.

At event E, master MSTR3 has asserted its request signal and the transfer begins at event F. The new arbitration cycle begins at event G, with master MSTR0 having the highest priority in this new sequence. During the arbitration cycle and the transfer of data involving MSTR3, master MSTR1 asserts its request signal REQ to request use of the bus 22. This request is held pending until the first transfer involving MSTR3 is completed. Each of the turn counters 26 is held with a value of MSTR1 during this period. At event I, the master MSTR1 performs the transfer and asserts the frame signal, and the next arbitration cycle (with MSTR2 having the highest priority) begins at event J.

Figure 4:
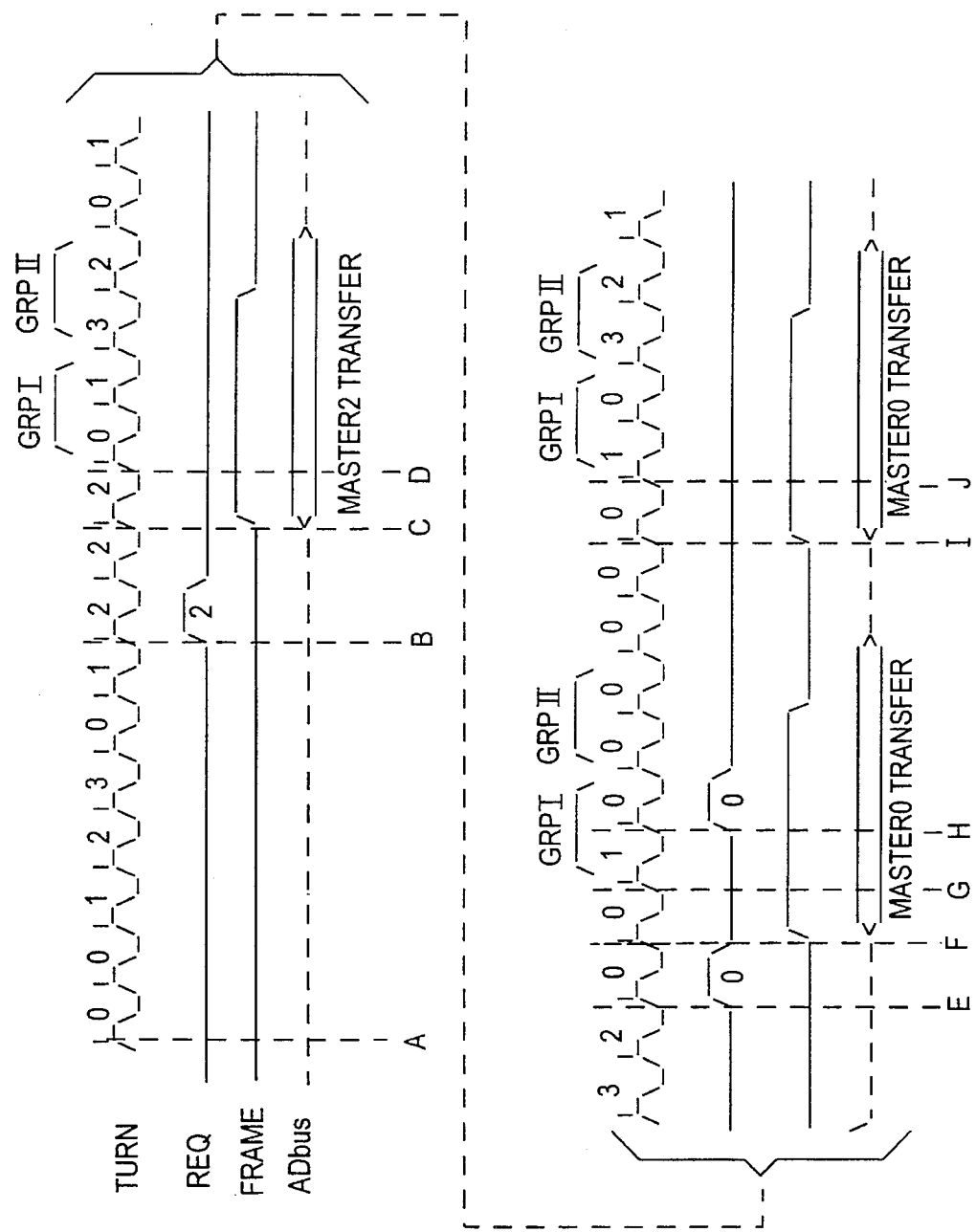
FIG. 4 is a timing diagram of an exemplary arbitration using another embodiment of the method of the present invention and the arrangement of FIG. 2.

Another embodiment of the method of the present invention is able to make use of the same arrangement as in FIG. 2, but is a fully distributed bus arbitration with both mixed round robin and fixed priority levels. An example of the operation of the system of FIG. 2 according to this method will be described with respect to FIG. 4. In certain systems, it is appropriate to give some of the requesting masters 20 higher priority than other requesting masters 20. In such cases, the such physical configuration with different protocols for assigning priority can be used. In this exemplary embodiment, masters MSTR0 and MSTR1 have higher priority than masters MSTR2 and MSTR3. Thus, two groups, group I and group II are used. Within group I, requesting masters MSTR0 and MSTR1 follow a round robin arbitration. Requesting masters MSTR2 and MSTR3 also follow round robin arbitration within group II. However, between groups I and II, group I always has a higher priority and is given the first chance to reserve the bus 22.

The turn counters 26 in each master 20 are reset at event A. At event B, the master MSTR2 asserts a request signal, each of the turn counters 26 being held at this value until the next arbitration cycle begins after the frame signal is asserted on the bus 22 at event C.

The next arbitration cycle begins at event D. Rather than following the turn counter 2 with the value 3, the new arbitration cycle starts with group I so that masters MSTR0 and MSTR1 are given the first opportunity to request use of the bus. However, in group II, since MSTR2 was the last master within group II to use the bus, a round robin format is followed so that master MSTR3 is given priority over master MSTR2.

At event E, the master MSTR0 requests use of the bus and performs a transfer at event F. Within group I, during the next arbitration cycle, the master MSTR1 is assigned priority over master MSTR0. Furthermore, group I has a fixed priority over the masters MSTR2 and MSTR3 in group II. Therefore, during the next arbitration cycle beginning at event G, the masters MSTR1 and MSTR0 are given the opportunity to request the bus before masters MSTR2 and MSTR3. In this example, MSTR0 requests the use of the bus at event H. This request is held pending until the transfer is completed. At event I, the second transfer involving master MSTR0 is initiated and the arbitration cycle begins again at event J. (Within group I, the master MSTR1 will still have priority over master MSTR0 since the master MSTR0 was the last master within group I to use the bus 22.)

Although mixed round-robin and fixed priority schemes are known, the use of such a scheme with a system having a single shared request line is not known and provides significant advantages in the reduction of signal traces.

The invention should not be considered limited to the specific mixed round-robin and fixed priority scheme described above. Other embodiments of the present invention include round robin between groups and fixed priority within a group; round robin between groups and round robin within a group; and fixed priority. In all of the cases, a user can belong to more than one group, thereby allowing a user to internally have more than one level of request priority. For example, where there is round robin within a group and the priority is fixed between groups (the originally described case), if a user 0 belonged to a group I and to a group II and the system arbitration protocol was defined for group I to always be ahead of group II (fixed priority between groups), the user 0 would use its turn in group I when a high priority request was pending and would use its turn in group II to issue low priority requests.

Figure 5:
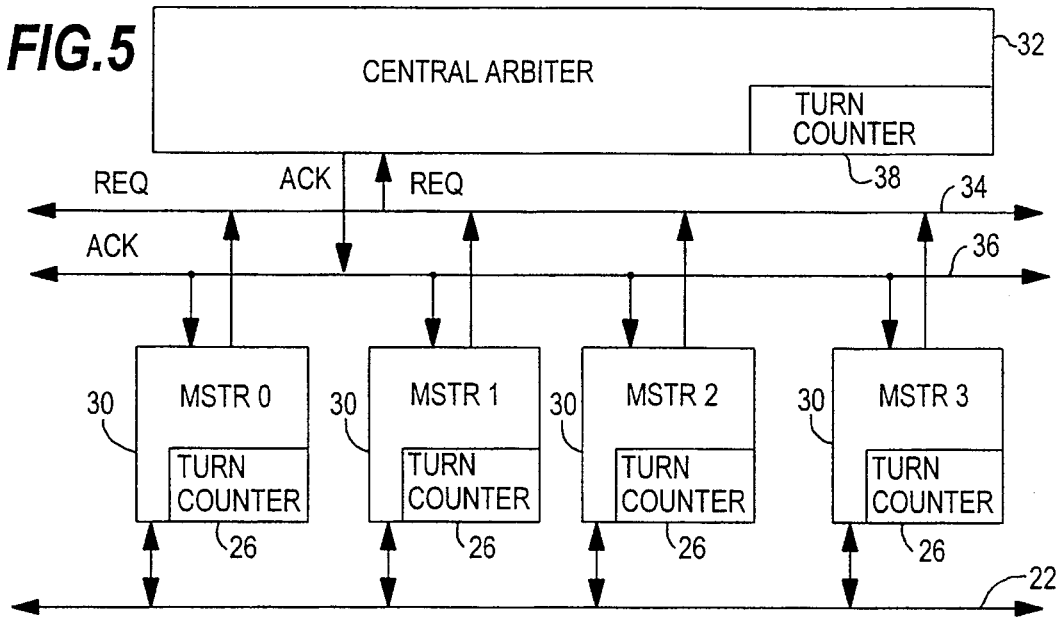
FIG. 5 is a block diagram of a computer system constructed in accordance with another embodiment of the present invention.

FIG. 5 is a block diagram of an embodiment of the present invention in which a central arbiter 32 performs arbitration among a plurality of masters 30 for use of a shared bus 22. Each of the masters 30 is coupled to a single shared request line 34 and a single shared acknowledge line 36. The request line 34 and the acknowledge line 36 are coupled to the central arbiter 32. Since only a single shared request line and a single shared acknowledge line that! are used, the pin connections to the central arbiter 32 are reduced to two pin connections, rather than the eight pin connections of the prior art.

The central arbiter 32 may be part of a subsystem which is a default master of the bus, such as a CPU, bus bridge, etc. The central arbiter 32 tracks requests and bus transfers and at the end of each transfer will issue a grant to a pending request if the central arbiter 32 does not wish to use or reserve the bus itself. In this manner, the requesting master 30 associated with the central arbiter 32 has the ability to effectively preempt pending requests by other masters by withholding the acknowledge signal until its own transfer is completed.

As in the embodiment of FIG. 2, the bus masters 30 share a single wire OR'ed, time multiplexed request line for issuing requests.

Figure 6:
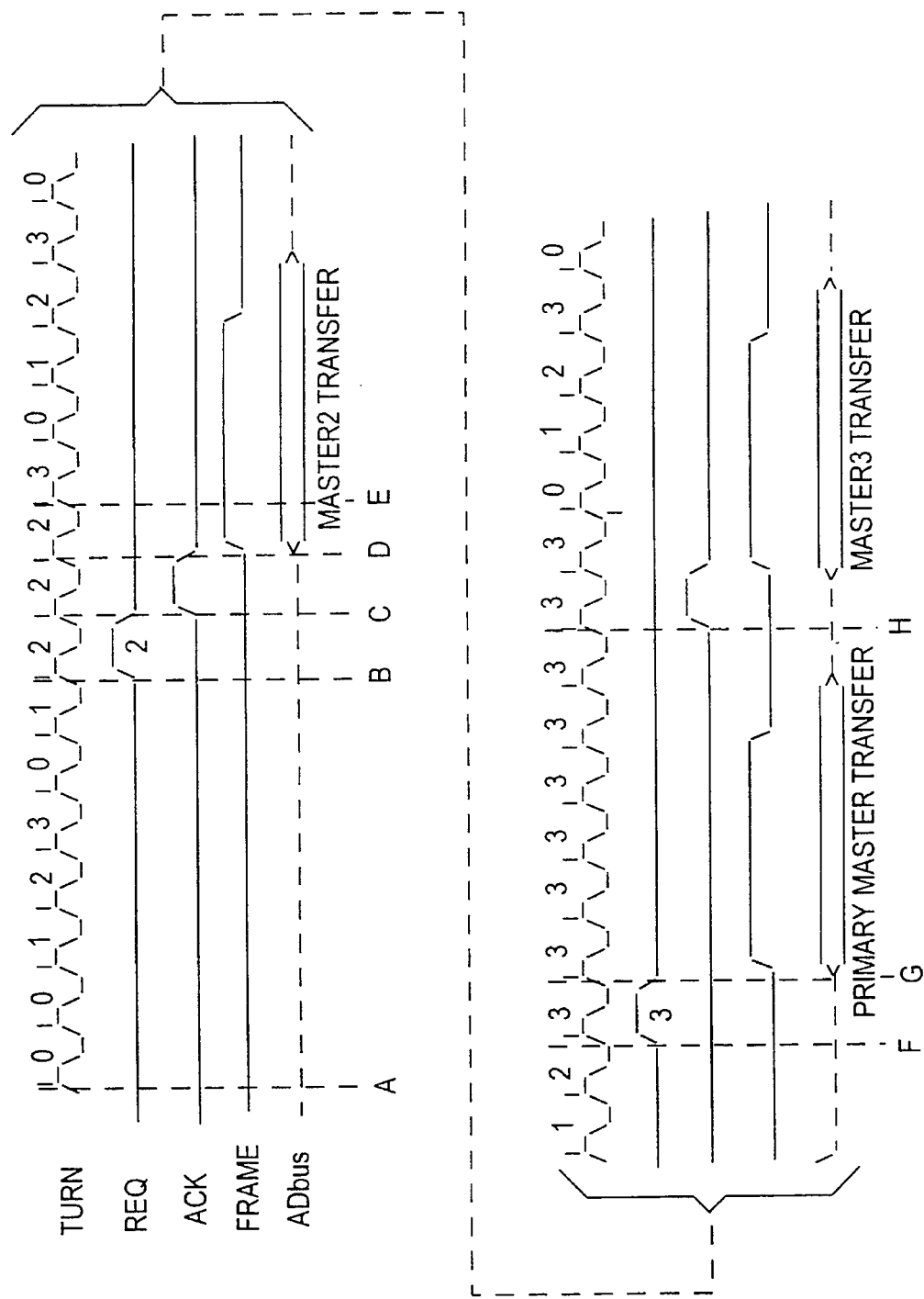
FIG. 6 is a timing diagram of an exemplary arbitration using another embodiment of the method of the present invention and the arrangement of FIG. 5.

FIG. 6 is a timing diagram depicting a method of operation using the embodiment of FIG. 5. The turn counter 38 in the central arbiter 32 is initialized by a reset at event A. The first master 30 to request use of the bus 22 at event B is master MSTR2. Unlike the embodiment of FIG. 2, however, the master MSTR2 must wait for the acknowledge signal ACK to be asserted by the central arbiter 32 before it can start its transfer. In this example, the central arbiter 32 asserts the ACK signal at event C. The master MSTR2 begins its transfer at event D. The next arbitration cycle, with MSTR3 having the highest priority, begins at event E.

At event F, master MSTR3 requests the bus with a request signal REQ. However, the central arbiter 32, acting as a primary master, preempts this request and instead asserts the frame signal and performs a transfer at event G. After the primary master (the central arbiter 32) has completed its transfer, the central arbiter 32 asserts the acknowledge signal on the shared acknowledge line 36. Since each of the masters 30 have been keeping track of the turn in the turn counter 26, each master 30 recognizes that it is master MSTR3 that has a pending transfer request. Master MSTR3 then performs its transfer.

Although the present invention has been described and illustrated in detail, it is clearly understood that the same is by way of illustration and example only and is not to be taken by way of limitation, the spirit and scope of the present being limited only by the terms of the appended claims.

I claim:

1. A shared resource arrangement comprising:

a shared resource;

a plurality of users coupled to the resource;

arbitration logic for arbitrating among the users for use of the resource, the arbitration logic allowing the users to make requests over a single shared request line in a given sequence of said users, and changing said sequence to a new sequence of said users after each use of the resource by one of the users, the requests being for use of the resource.

2. The arrangement of claim 1, wherein the users follow each other in a same defined order within each sequence, the arbitration logic assigning a first position within each said new sequence to the user that follows in said order the user which has most recently used the resource.

3. The arrangement of claim 1, wherein each user has means for generating request signals to the arbitration logic during an arbitration cycle of the arbitration logic.

4. The arrangement of claim 1, wherein the users follow each other in an order defined by a mixed round robin and fixed priority format, in which a group of users has fixed priority over another group of users in each of the sequences, and the users are assigned priority within each group of users such that the last user in the group to use the resource has the lowest priority of that group.

5. The arrangement of claim 1, wherein the users follow each other in an order defined by a round robin between groups and fixed priority within a group, in which a group of users are assigned priority over another group of users such that the last group of users to use the resource has the lowest priority among groups, and the users are assigned a fixed priority within each group of users.

6. The arrangement of claim 1, wherein the users follow each other in an order defined by round robin between groups and round robin within a group, in which a group of users are assigned priority over another group of users such that the last group of users to use the resource has the lowest priority among groups, and the users are assigned priority within each group of users such that the last user in the group to use the resource has the lowest priority of that group.

7. The arrangement of claim 1, wherein the users follow each other in a fixed priority.

8. The arrangement of claim 1, wherein the resource is a bus and the users are bus masters.

9. The arrangement of claim 1, further comprising a single shared request line that couples all of the users together, the arbitration logic receiving said requests over said request line and responding to the received request.

10. The arrangement of claim 3, wherein each user has means for monitoring request signals generated by the other users and a turn counter for tracking a user number associated with the user that is currently allowed to make a request for use of the resource.

11. The arrangement of claim 4, wherein a user belongs to more than one group, and has multiple internal levels of request priority.

12. The arrangement of claim 5, wherein a user belongs to more than one group, and has multiple internal levels of request priority.

13. The arrangement of claim 6, wherein a user belongs to more than one group, and has multiple internal levels of request priority.

14. The arrangement of claim 9, wherein the requests are time multiplexed with the individual users assigned to different time slots in said given sequence.

15. The arrangement of claim 10, wherein each user has means for generating frame signals to the arbitration logic that indicate use of the resource by one of the users.

16. The arrangement of claim 14, wherein the arbitrating for a next use of the resource occurs in parallel with a current use of the resource by one of the users.

17. The arrangement of claim 15, wherein the arbitration logic includes means for resetting the turn counter of each user to a predetermined initial state.

18. The arrangement of claim 17, wherein each user includes means for incrementing the turn counter synchronously with the turn counters of the other users during each cycle of the shared resource arrangement until the means for monitoring detects a request signal generated by one of the users.

19. The arrangement of claim 18, wherein each user includes means for holding the turn counter at the user number associated with the user that generated the request signal.

20. The arrangement of claim 19, wherein each user includes means for releasing the turn counter synchronously with the turn counters of the other users upon the generation of one of said frame signals, said means for incrementing again incrementing the turn counter synchronously in response to the release of the turn counter.

21. The arrangement of claim 20, wherein the users follow each other in a same defined order within each sequence, the arbitration logic assigning a first position within each said new sequence to the user that follows in said order the user which has most recently used the resource, and wherein the means for incrementing starts incrementing at the user number of said user that follows the user which has most recently used the resource.

22. A shared resource arrangement comprising:

a shared resource;

a plurality of users coupled to the resource;

a central arbiter coupled to the plurality of users for arbitrating among the users for use of the resource, the arbiter having a given sequence in which the users are permitted to request use of the resource over a single shared request line, the arbiter changing said sequence to a new sequence after each use of the resource by one of the users.

23. The arrangement of claim 22, further comprising a single shared request line and a single shared acknowledge line, each coupling all of the users to the central arbiter, the central arbiter receiving said requests over said request line and producing acknowledgements of said requests over said acknowledge line.

24. The arrangement of claim 22, wherein each user has means for generating request signals to the arbiter during an arbitration cycle of the arbiter.

25. The arrangement of claim 22, wherein the users follow each other in a same defined order within each sequence, the arbiter assigning a first position within each said new sequence to the user that follows in said order the user which has most recently used the resource.

26. The arrangement of claim 22, wherein the users follow each other in an order defined by a mixed round robin and fixed priority format, in which a group of users has fixed priority over another group of users in each of the sequences, and the users of each group are assigned priority within that group such that the last user in the group to use the resource has the lowest priority of that group.

27. The arrangement of claim 23, wherein the requests are time multiplexed with the individual users assigned to different time slots in said given sequence.

28. The arrangement of claim 24, wherein each user has means for monitoring request signals generated by the other users and a turn counter for tracking a user number associated with the user that is currently allowed to make a request for use of the resource.

29. The arrangement of claim 22, wherein the resource is a bus and the users are bus masters.

30. The arrangement of claim 27, wherein the arbitrating for a next use of the resource occurs in parallel with a current use of the resource by one of the users.

31. The arrangement of claim 28, wherein the arbiter includes means for resetting the turn counter of each user to a predetermined initial state.

32. The arrangement of claim 30, wherein the users follow each other in a same defined order within each sequence, the arbiter assigning a first position within each said new sequence to the user that follows in said order the user which has most recently used the resource.

33. The arrangement of claim 31, wherein each user includes means for incrementing the turn counter synchronously with the turn counters of the other users during each cycle of the shared resource arrangement until the means for monitoring detects a request signal generated by one of the users.

34. The arrangement of claim 33, wherein each user includes means for holding the turn counter at the user number associated with the user that generated the request signal.

35. The arrangement of claim 34, wherein each user includes means for releasing the turn counter synchronously with the turn counters of the other users upon the production of said acknowledgement, said means for incrementing again incrementing the turn counter synchronously in response to the release of the turn counter.

36. A method of arbitrating among users for a shared resource, the method comprising:

a. assigning time slots to the users in a sequence;

b. sequencing through the time slots according to the sequence, each user able to issue a request only during the time slot assigned to that user;

c. accepting a request from a user issuing a request during the time slot assigned to said user and allowing the user to use the shared resource;

d. changing the sequence of users after use of the shared resource by the user allowed to use the shared resource; and e. repeating steps b–d.

37. The method of claim 36, wherein the sequence is changed such that the users follow each other in a same defined order within each sequence, the step of changing the sequence including assigning a first position within each changed sequence to the user that follows in said order the user which has most recently used the resource.

38. The arrangement of claim 36, wherein the sequence is changed such that the users follow each other in an order defined by a mixed round robin and fixed priority format, in which a group of users has fixed priority over another group of users in each of the sequences, and the users are assigned priority within each group of users such that the last user in the group to use the resource has the lowest priority of that group.

39. The method of claim 36, wherein users are able to issue the request on a single request line, the accepting step comprising receiving the request from the single request line.

\* \* \* \* \*